Aug. 2, 1932.  W. A. HAWKINS ET AL  1,870,113
SEPARATING MACHINE
Filed March 7, 1931   2 Sheets-Sheet 2

Patented Aug. 2, 1932

1,870,113

UNITED STATES PATENT OFFICE

WILLIAM A. HAWKINS, OF ENSLEY, AND GUY W. LATHEM, OF BESSEMER, ALABAMA

SEPARATING MACHINE

Application filed March 7, 1931. Serial No. 520,864.

This invention relates to separators especially designed for separating oil from water and basic sediment, an object being to provide a centrifugal separator for this purpose into which the crude oil is fed and separation effected, and the pure oil, and the water and basic sediment separately discharged.

Another object of the invention is the provision of a machine of the above character which is simple and reliable in construction and operation, and efficient in use.

With the above and other objects in view, the invention further includes the following novel features and details of construction, to be hereinafter more fully described, illustrated in the accompanying drawings and pointed out in the appended claim.

In the drawings:—

Figure 1:
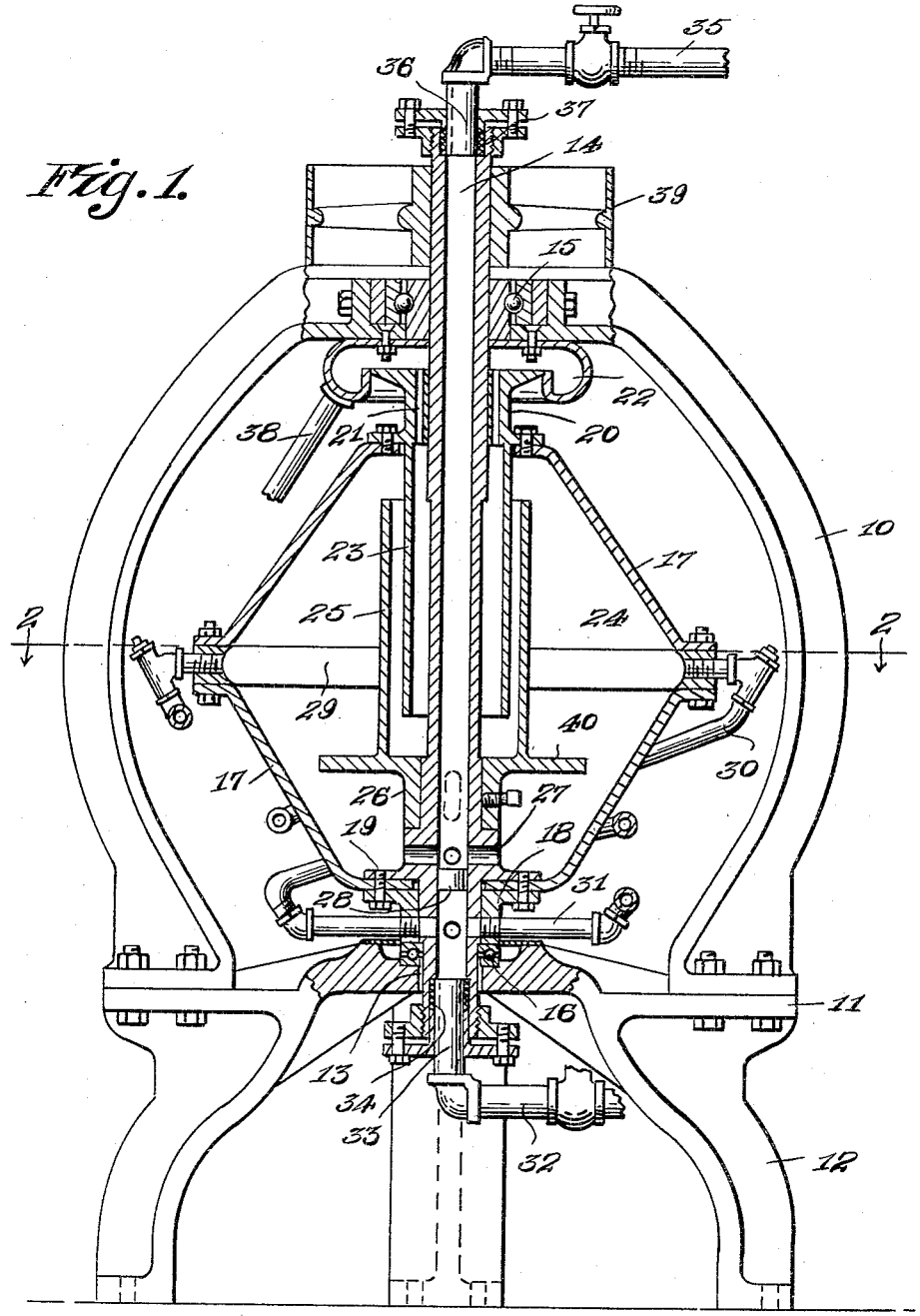
Figure 1 is a vertical sectional view of a centrifugal separator constructed in accordance with the invention.
Figure 2:
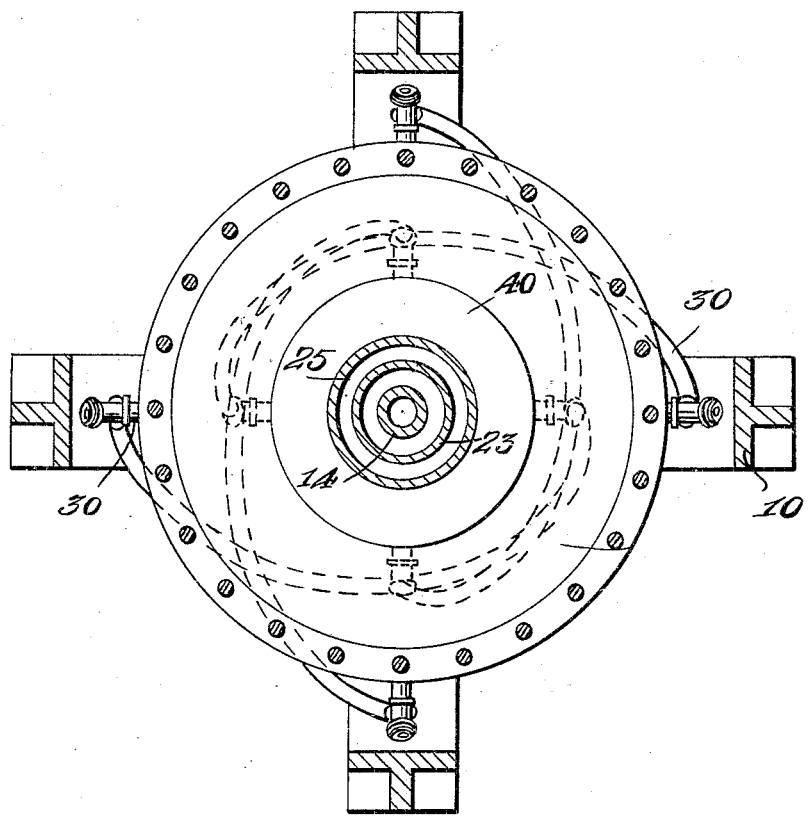
Figure 2 is a section on the line 2—2 of Figure 1.

Referring to the drawings in detail wherein like characters of reference denote corresponding parts, the machine as shown comprises a frame 10 which includes a base 11, the latter being mounted upon legs 12 and provided with a central opening 13.

Mounted for rotation in the frame and extending through the opening 13 is a vertically disposed hollow shaft 14. The upper end of this shaft is rotatable in bearings 15 provided at the upper end of the frame, while the lower end of the shaft is rotatably supported upon a thrust bearing 16.

Supported by and rotatable with the hollow shaft 14 is a casing which includes oppositely inclined side walls 17. The lower end of these walls is secured to the hollow shaft 14 and to a collar 18 as shown at 19, while the walls at their upper end are secured to a collar 20 which is provided with passages 21. These passages provide communication between a stationary oil collecting chamber 22 which is fast with the frame 10, and a sleeve 23 which extends downwardly into a separating chamber 24 defined by the walls 17. The sleeve 23 is spaced from and disposed concentrically about the shaft 14 and its lower open end communicates with a sleeve 25 which also surrounds the shaft and is spaced outwardly from the sleeve 23. The lower end of the sleeve 25 is closed and is provided with a hub 26, which is secured to the shaft 14, while the upper end of the sleeve 25 is open and is in communication with the separating chamber 24.

The shaft 14 is provided with laterally extending openings or passages 27 which provide communication between the interior of the shaft 14 and the separating chamber 24, while a plug 28 located within the hollow shaft 14 below the passages 27 closes the hollow shaft at this point.

The separating chamber 14 has its greatest diameter centrally of its height and provides at this point an annular collecting trough 29. Communicating with this trough are the upper ends of pipes 30 which are arranged in spiral formation about the housing 17 and have their lower ends in communication with the hollow shaft 14 below the plug 28, as shown at 31.

A discharge pipe 32 is in communication with the lower end of the hollow shaft 14 as shown at 33 and as the shaft rotates about this pipe, a packing gland 34 is provided to insure a leakproof joint. A supply pipe 35 is in communication with the upper end of the hollow shaft 14 as shown at 36 and this pipe is likewise stationary and is surrounded by a packing gland 37. The discharge pipe 38 leads from the oil chamber 22.

A pulley 39 is fast upon the shaft 14 and provides means for connection with a suitable source of power.

Crude oil is fed to the separator through the pipe 35 and passes downward through the hollow shaft 14 into the separating chamber through the passages 27. Rotation of the housing 17 throws the crude oil outward against the inclined walls of the housing, centrifugal action to this end being assisted by an annular flange 40 which extends outward from the lower end of the sleeve 25. Water and basic sediment enters the collecting trough 29 and passes outward into the pipes 30 and through these pipes into the lower end of the hollow shaft 14, and outward through the discharge pipe 32. The pure or separated oil passes outward and enters the upper end of the sleeve 25, and from this sleeve passes upward into the lower end of the sleeve 23, from which it passes into the oil chamber 22 through the passages 21, from where it is discharged through the pipe 38.

The invention is susceptible of various changes in its form, proportions and minor details of construction and the right is herein reserved to make such changes as properly fall within the scope of the appended claim.

Having described the invention what is claimed is:—

A separator comprising cone-shaped housing sections, a trough member interposed between the larger ends of said sections, a support for the housing, pipes connecting said trough with the housing support, a hollow shaft fixed to the housing sections and journaled in said support and having openings adapted to communicate with said pipes, said shaft having other openings adapted to communicate with the interior of the lower housing section, a plug between the first and second named group of openings, overlapping baffle sleeves fixed to the pipe and the upper housing section respectively and disposed transversely across said trough and a collecting chamber mounted upon the pipe and having a passageway communicating with the interior of one of said baffle sleeves.

In testimony whereof we affix our signatures.

WILLIAM A. HAWKINS.
GUY W. LATHEM.